US012752860B2

(12) United States Patent
Perez

(10) Patent No.: US 12,752,860 B2
(45) Date of Patent: Oct. 6, 2026

(54) PROTECTIVE FRAME FOR THE WHEEL OF AN AGRICULTURAL WORK VEHICLE

(71) Applicant: CNH Industrial Brasil Ltda., Nova Lima (BR)

(72) Inventor: Thiago Kato Perez, Piracicaba (BR)

(73) Assignee: CNH Industrial Brasil Ltda., Nova Lima (BR)

(*) Notice: Subject to any disclaimer, the term of this patent is extended or adjusted under 35 U.S.C. 154(b) by 436 days.

(21) Appl. No.: 18/231,482

(22) Filed: Aug. 8, 2023

(65) Prior Publication Data

US 2024/0051610 A1 Feb. 15, 2024

(30) Foreign Application Priority Data

Aug. 12, 2022 (BR) ...................... 10 2022 016075 9

(51) Int. Cl.
*B62D 25/18* (2006.01)
*A01B 76/00* (2006.01)

(52) U.S. Cl.
CPC .............. *B62D 25/18* (2013.01); *A01B 76/00* (2013.01)

(58) Field of Classification Search
CPC .................................. B62D 25/01; A01B 7/00
USPC .......................................................... 280/160
See application file for complete search history.

(56) References Cited

U.S. PATENT DOCUMENTS 767,242 A 8/1904 Reichle, Jr. et al.
1,341,008 A * 5/1920 Brown ................. B62D 25/186 280/156
2,690,342 A 9/1954 Willey
5,169,167 A 12/1992 Willson et al.
5,241,780 A 9/1993 Zaun et al.
5,403,026 A * 4/1995 Dahl ...................... B62D 25/16 172/517
5,836,399 A * 11/1998 Maiwald .............. B62D 25/186 280/157
5,974,773 A 11/1999 Rieck et al.
6,095,562 A * 8/2000 Busse ..................... B60R 21/00 280/727
6,349,954 B1 * 2/2002 Deziel .................. B62D 25/186 280/849
6,802,517 B1 * 10/2004 Wuthrich ............... B62D 25/18 280/157
6,893,048 B2 5/2005 Rush et al.
7,537,219 B1 * 5/2009 Sherwood ................ B60G 3/14 280/6.151
(Continued)

FOREIGN PATENT DOCUMENTS

BR 102021004699 A2 * 9/2022 .......... A01M 7/0075
BR 102021019946 4/2023
(Continued)

Primary Examiner — James A Shriver, II
(74) *Attorney, Agent, or Firm* — Fletcher Yoder, P.C.

(57) ABSTRACT

A protective frame for a wheel of an agricultural work vehicle has three installation possibilities: upper protective frame, lower protective frame, and integral protective frame. The protective frames, or row openers, are designed to prevent the wheel from engaging the crops during operation. The protective frame includes a segment configured to surround at least a front portion of the wheel and a fastener. The protective frame can also include additional frame segments to form the integral protective frame, being a combined installation of the upper and lower protective frames.

16 Claims, 13 Drawing Sheets

(56) References Cited

U.S. PATENT DOCUMENTS

| | | | | |
|---|---|---|---|---|
| 7,617,882 | B1 * | 11/2009 | Street | E02F 3/627 172/833 |
| 7,669,798 | B2 * | 3/2010 | Guering | B64C 25/32 244/100 R |
| 7,976,041 | B2 * | 7/2011 | Chuang | B62J 15/02 280/848 |
| 8,388,003 | B2 | 3/2013 | Wellman et al. | |
| 8,770,655 | B1 * | 7/2014 | Godby | B62D 25/163 280/848 |
| 9,603,305 | B2 * | 3/2017 | Rau | B62D 25/16 |
| 10,400,422 | B2 | 9/2019 | Angelo et al. | |
| 10,518,827 | B2 | 12/2019 | Ibanez Moreira et al. | |
| 10,542,656 | B2 | 1/2020 | Blunier | |
| 10,602,733 | B1 | 3/2020 | Beyea | |
| 10,953,928 | B2 | 3/2021 | Angelo | |
| 11,262,344 | B2 | 3/2022 | Schoeny | |
| 11,453,444 | B2 * | 9/2022 | Bowen | B62D 65/16 |
| 11,589,494 | B2 | 2/2023 | Smith et al. | |
| 11,753,082 | B2 * | 9/2023 | Moradnia | B62D 25/186 280/152.05 |
| 11,772,441 | B2 | 10/2023 | Lumini | |
| 11,980,115 | B2 | 5/2024 | Perez | |
| 2005/0001454 | A1 | 1/2005 | Rush et al. | |
| 2006/0108765 | A1 | 5/2006 | Teich | |
| 2010/0253034 | A1 | 10/2010 | Crismon et al. | |
| 2011/0080019 | A1 | 4/2011 | Castillo | |
| 2012/0080908 | A1 | 4/2012 | Wellman et al. | |
| 2015/0230392 | A1 | 8/2015 | Schafer et al. | |
| 2015/0299982 | A1 | 10/2015 | Angelo et al. | |
| 2016/0174454 | A1 | 6/2016 | Phan et al. | |
| 2018/0257716 | A1 | 9/2018 | Haeseker et al. | |
| 2018/0310459 | A1 | 11/2018 | Blunier | |
| 2019/0118874 | A1 | 4/2019 | Ibanez Moreira et al. | |
| 2019/0300069 | A1 * | 10/2019 | Angelo | B62D 25/186 |
| 2020/0355667 | A1 | 11/2020 | Schoeny | |
| 2021/0127540 | A1 | 5/2021 | Smith et al. | |
| 2022/0177043 | A1 | 6/2022 | Bowen et al. | |
| 2022/0287288 | A1 | 9/2022 | de Andrade Alves et al. | |
| 2022/0287289 | A1 | 9/2022 | de Andrade Alves et al. | |
| 2023/0018825 | A1 | 1/2023 | Bowen et al. | |
| 2023/0106231 | A1 * | 4/2023 | Perez | B62D 25/161 172/310 |
| 2023/0107894 | A1 * | 4/2023 | Perez | B62D 25/182 280/5.514 |
| 2023/0110766 | A1 | 4/2023 | Lumini | |
| 2024/0051610 | A1 * | 2/2024 | Perez | B62D 25/18 |

FOREIGN PATENT DOCUMENTS

| | | | | | |
|---|---|---|---|---|---|
| CA | 2189592 | A | * | 5/1998 | |
| CA | 2189592 | C | * | 5/2004 | A01D 63/04 |
| EP | 4640501 | A1 | * | 10/2025 | B62D 25/168 |
| FR | 2743345 | A1 | | 7/1997 | |
| FR | 2813847 | A1 | | 3/2002 | |
| GB | 2523673 | A | | 9/2015 | |
| KR | 101816438 | B1 | | 1/2018 | |
| WO | WO-2022120233 | A1 | * | 6/2022 | B62D 25/18 |
| WO | 2023218256 | A1 | | 11/2023 | |

* cited by examiner

PROTECTIVE FRAME FOR THE WHEEL OF AN AGRICULTURAL WORK VEHICLE

CROSS-REFERENCE TO RELATED APPLICATION

This application claims priority from and the benefit of BR Application No. 10 2022 016075 9, entitled "PROTECTIVE FRAME FOR THE WHEEL OF AN AGRICULTURAL WORK VEHICLE", filed Aug. 12, 2022, which is hereby incorporated by reference in its entirety.

FIELD OF THE INVENTION

The present invention relates, in general, to protective frames and, more particularly, to a protective frame for wheel of an agricultural work vehicle with three installation possibilities.

BACKGROUND OF THE INVENTION

Various types of work vehicles use applicators (e.g., sprayers, floats, etc.) to deliver a substance (e.g., fertilizer, pesticides, herbicides, or other products) to a soil surface in a field. From this soil surface agricultural crops can extend. The agricultural work vehicle may comprise an agricultural applicator with a lance assembly configured to facilitate product delivery over wide swaths of the field.

These work vehicles that use applicators are robust and reach high heights, so that their wheels are high, and exceed the entire length of the agricultural crops arranged in cultivation lines. To prevent the wheels of work vehicles from damaging the crops during operation, a protective frame, or also known as a row opener, is used for the wheels.

A protective frame is a piece that attaches to the front of a wheel on an agricultural work vehicle (relative to the vehicle's direction of travel). These frames aim to protect agricultural crops so that they are not run over or damaged by the wheels of the vehicle during its movement. As the agricultural work vehicle travels through the field, the wheels move in the space between the crop lines and the frames open the way between the lines, pushing to the sides the branches and ramifications of the agricultural crops that, eventually, are projected into the space between the crop lines.

U.S. Pat. No. 5,836,399A discloses a protective frame composed of closed plates with the possibility of transverse adjustment to be accommodated in different spaces between rows of cultivation. U.S. Pat. No. 5,403,026A describes an integral, welded deflector frame with a spearhead at the front that repels crop branches projecting into the space between crop rows. Document BR102021019946-6 discloses a protective frame with interchangeability between an open protective frame and a closed protective frame (plastic plates).

Current protective frames, in addition to being bulky and heavy, take many hours to install. Also, the protective frames favor the accumulation of dirt in the frames and do not take into account the height of the agricultural crops that will be handled and do not allow for different assembly configurations in their designs.

Another important point that is not considered by current frames is the regulation of the distance between the ground and the protective frame of the wheel. While a smaller distance is desirable for a better efficiency in opening the crop lines, a greater distance prevents the protective frame from hitting the ground (which can damage the frame), especially when the agricultural work vehicle goes over uneven or bumpy terrain.

Consequently, it is an objective of the present invention to provide an improved open protective frame for wheel of an agricultural work vehicle of simpler configuration, lower cost, which is adaptable to different conditions, in addition to solving the problems of the prior art.

BRIEF DESCRIPTION OF THE INVENTION

Aspects and advantages of the invention will be set forth, in part, in the following description, or may be obvious from the description, or may be learned through practice of the invention.

The present invention refers to an open protective frame for wheel of an agricultural work vehicle with three installation possibilities. In one embodiment, the protective frame includes a first base segment configured to at least partially surround the front portion of a wheel of an agricultural work vehicle, and a primary fastener element configured to secure the base segment to the wheel. The primary fastener element being secured to the wheel suspension frame.

According to additional or alternative embodiments of the present invention, the following characteristics, and their possible variants, may also be present, alone or in combination:

- the primary fastener element has an auxiliary fastener plate, the auxiliary fastener plate has a bent end that allows the securement of the fastener element on inclined surfaces;
- a secondary fastener element secured to the wheel suspension frame, the secondary fastener element having a hole at one end to be fitted and welded to the base segment;
- a second base segment configured to at least partially surround the front part of a wheel of an agricultural work vehicle with a primary fastener element configured to secure the base segment to the wheel, the primary fastener element being secured to the secondary fastener element, the primary and secondary fastener element members being secured to the wheel suspension frame. Furthermore, there are two auxiliary fastener plates being secured to the external ends of the base segments. The primary stabilization segment connects the first and second base segments at the front of the wheel, the secondary stabilization segment connects the first and second base segments via auxiliary fastener plates on the outside of the wheel;
- the primary fastener element and the auxiliary fastener plates are welded to the base segment;
- the primary stabilization segment and the secondary stabilization segment are elongated metal plates of variable length;
- the ends of the primary stabilization segment are drilled and secured through removable fastener devices on auxiliary fastener plates drilled and welded to the base segments;
- the ends of the secondary stabilization segment are drilled and secured using removable fastener devices on the auxiliary fastener plates;
- the base segment being a single piece, metallic and segmented, in which the segments are delimited by curves or joined by welds;

Removable fastener devices are screws, clips or rivets.

These and other aspects, functions and advantages of the present invention will become better understood with reference to the following description and appended claims. The attached drawings, which are incorporated into and form a part of this specification, illustrate the embodiments of the invention and, together with the description, serve to explain the principles of the invention.

BRIEF DESCRIPTION OF THE FIGURES

A complete and enabling description of the present invention, which includes its different embodiments, directed to a person of common skill in the art, is presented in the specification, which makes reference to the attached figures, in which.

DETAILED DESCRIPTION OF THE INVENTION

Figure 1:
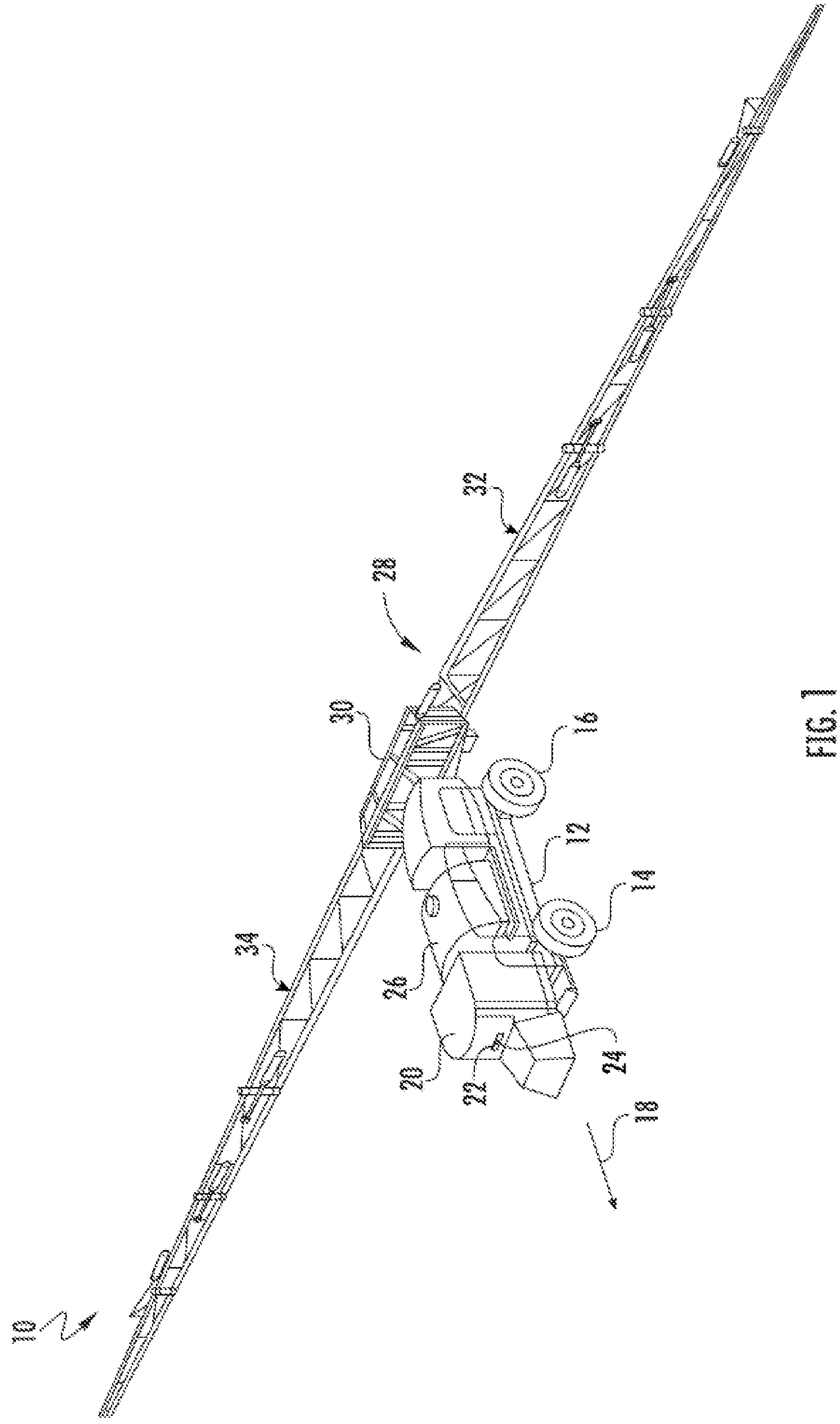
FIGS. 1 and 2 illustrate views in perspective and side, respectively, of an agricultural work vehicle in which open protective frames will be used in accordance with aspects of the present subject matter.

Reference will now be made in detail to the embodiments of the invention, one or more examples of which are illustrated in the drawings. Each example is provided by way of explanation of the invention, without limitation of the invention. Indeed, it will be apparent to those skilled in the art that various modifications and variations can be made to the present invention without departing from the scope or spirit of the invention. For example, functions illustrated or described as part of some embodiments may be used with another embodiment to produce a still further embodiment. Thus, the present invention should cover such modifications and variations as they are presented within the scope of the appended claims and their equivalents.

In this document, relational terms, such as first and second, superior and inferior, and the like, are used only to distinguish one entity or action from another entity or action without necessarily requiring to imply any actual relationship or order between such entities or actions. The terms “comprises”, “comprising”, or any other variation thereof, shall encompass a non-exclusive inclusion, so that a process, method, article or apparatus comprising a list of elements does not include just those elements, but includes other elements not expressly listed or inherent in such process, method, article or apparatus. An element preceded by “comprises . . . a” does not, without further restriction, prohibit further identical elements in the process, method, article or apparatus comprising the element.

As used in this document, the term “and/or”, when used in a list of two or more items, means that any one of the items listed can be used alone or any combination of two or more items listed may be employed. For example, if a composition or assembly is described as containing components A, B and/or C, the composition or assembly may contain only A; only B; only C; A and B in combination; A and C in combination; B and C in combination; or A, B and C in combination.

In general, the present invention refers to an open protective frame, also known as a line opener, for the wheel of an agricultural work vehicle, which has three possibilities of embodiments. The protective frame of the present invention was originally developed for agricultural spraying vehicles for sugarcane cultivation, but it can be used in agricultural vehicles with other applications and in other cultures, due to its simple configuration and easy installation. The protective frame is mounted on the front part of the wheels of an agricultural work vehicle and can be used in three different conditions: (i) upper protective frame, installed farther from the ground; (ii) lower protective frame, installed closer to the ground; (iii) integral protective frame, being a combined installation of the upper protective frame (i) and the lower protective frame (ii).

With option (i), the protective frame is further from the ground and, therefore, is more suitable for highly irregular and bumpy terrain, as it prevents the frame from hitting the ground. With option (ii), the protective frame is closer to the ground and, therefore, improves efficiency in opening the crop lines, preventing damage and losses to the crop. Finally, in option (iii), the protective frame is more robust and maintains proximity to the ground, therefore, it improves efficiency in opening the crop rows and is more resistant to eventual shocks against the ground, combining the advantages of the options (i) and (ii), being more suitable for terrains with low to medium irregularities.

The protective frame of the present invention includes a first base segment for at least partially encircling the front part of a wheel of an agricultural work vehicle, a primary fastener element for securing the base segment to the wheel, the primary fastener element being secured on the wheel suspension frame.

Alternatively, the primary fastener element has an auxiliary fastener plate, the auxiliary fastener plate has a bent end which permits fastening of the fastener element on sloped surfaces. The primary fastener element can be welded to the base segment. Also, a secondary fastener element can be secured to the wheel suspension frame, with a hole at one end to be fitted and welded to the base segment.

Additionally, the present invention can have a second base segment configured to at least partially surround the front of a wheel of an agricultural work vehicle with a further primary fastener element for securing the second base segment to the wheel. One primary fastener element being secured to the secondary fastener element, the other primary fastener element and the secondary fastener element being secured to the wheel suspension frame. Further, the present invention may have auxiliary fastener plates, a primary stabilization segment and a secondary stabilization segment connecting the first and second base segments at the front and outside of the wheel, respectively.

The primary and secondary stabilization segments are elongated metal plates of varying lengths. The ends of the stabilization segments are drilled and secured using removable fastener devices, which may be screws, clips or rivets, to auxiliary fastener plates drilled and welded to the base segments. The base segment is usually a single piece, metallic and segmented, in which the segments are delimited by curves (bends) or joined by welds.

Figure 2:
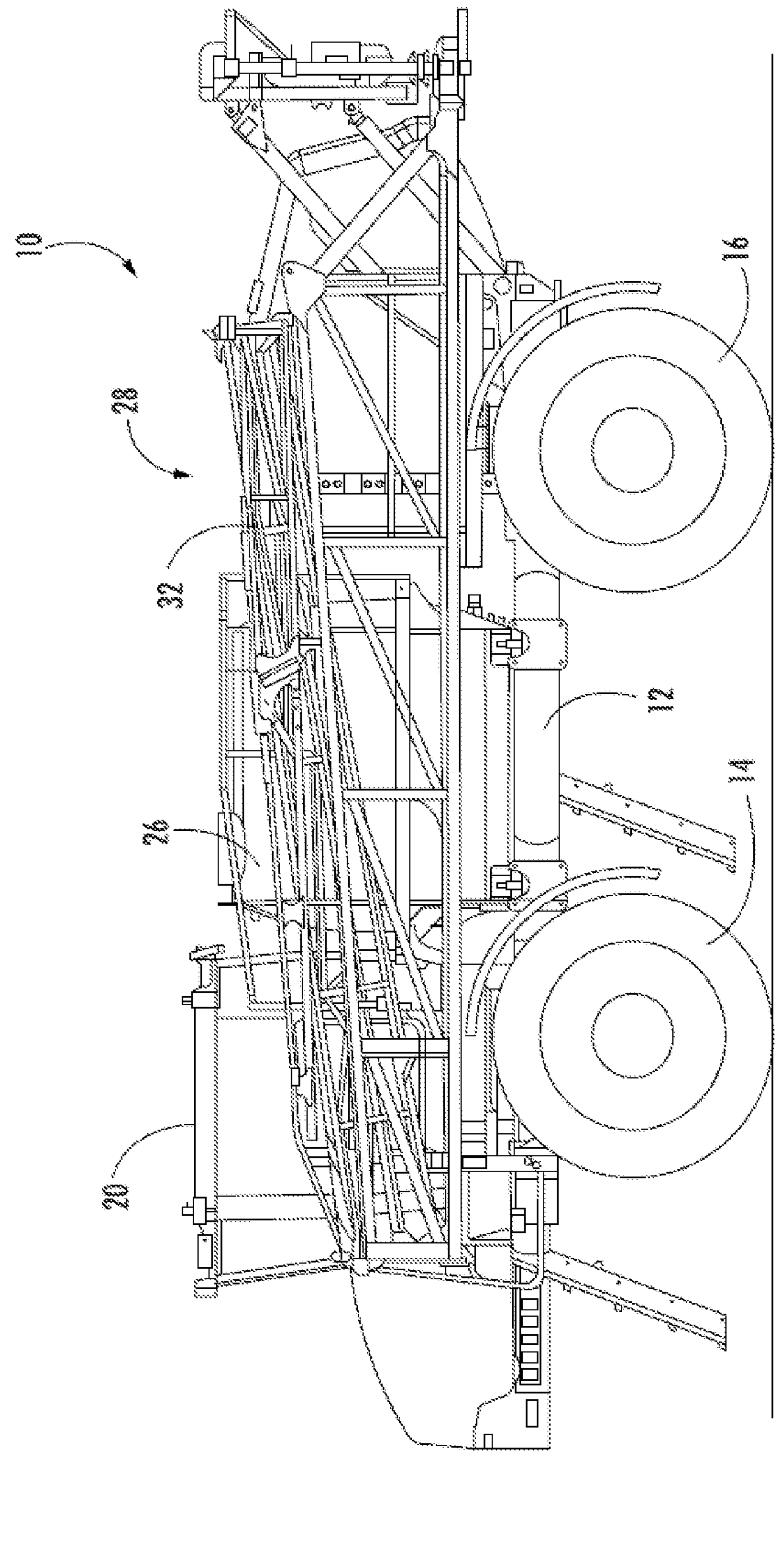

Referring now to FIGS. 1 and 2, an agricultural work vehicle 10 configured as a self-propelled agricultural applicator is illustrated. Embodiments of the invention are configured to be applied to wheels of vehicles of this type.

In various embodiments, work vehicle 10 can include a chassis 12 configured to support or mate with a plurality of components. For example, the front and rear wheels 14, 16 can be secured to the chassis 12. The wheels 14, 16 can be configured to support the work vehicle 10 relative to a ground surface and move the work vehicle 10 in one direction path (for example, as indicated by arrow 18 in FIG. 1) in a field or on the surface of the ground. In this regard, the work vehicle 10 may include a power plant, such as an engine, a prime mover, or a hybrid engine-prime mover combination, for moving the vehicle 10 across the field. In some instances, work vehicle 10 may also include a transmission configured to transmit power from the engine to either wheel 14, 16.

Chassis 12 can also support an operator station 20, such as a cab, which provides various control or input devices (e.g., levers, pedals, control panels, buttons and/or the like) to allow an operator to control the operation of the work vehicle 10. For example, as shown in FIG. 1, the work vehicle 10 may include a human machine interface (HMI) 22 to display messages and/or alerts to the operator and/or to allow the operator to interface with the vehicle controller. In some embodiments, the HMI 22 may include one or more user input devices 24 in the form of switches, buttons, knobs and/or any other device that allows the operator to provide user input to the controller.

Furthermore, the chassis 12 can also support a tank 26 and a boom assembly 28 mounted on the chassis 12. The tank 26 is generally configured to store or hold an agricultural substance, such as a pesticide, a fungicide, a rodenticide, a fertilizer, a nutrient, and/or the like. Agricultural substance stored in tank 26 can be dispensed onto the underlying soil surface (e.g. plants and/or soil) through one or more dispensers (such as nozzles) mounted on lance assembly 28.

As shown in FIGS. 1 and 2, the boom assembly 28 may include a frame that supports the first and second boom arms 32, 34 in a cantilevered nature. The first and second boom arms 32, 34 are generally movable between an operational or non-folded position (FIG. 1) and a non-operative or folded position (FIG. 2). During product distribution, the first and/or second boom arms 32, 34 extend laterally out of the working vehicle 10 in order to cover wide swaths of soil application, as illustrated in FIG. 1. However, in order to facilitate transportation, each boom arm 32, 34 of the boom assembly 28 can be independently folded forward or backward in the non-operating position, thereby reducing the overall width of the vehicle 10 or, in some examples, the overall width of a towable implement when the applicator is configured to be towed behind the work vehicle 10.

Figure 3A:
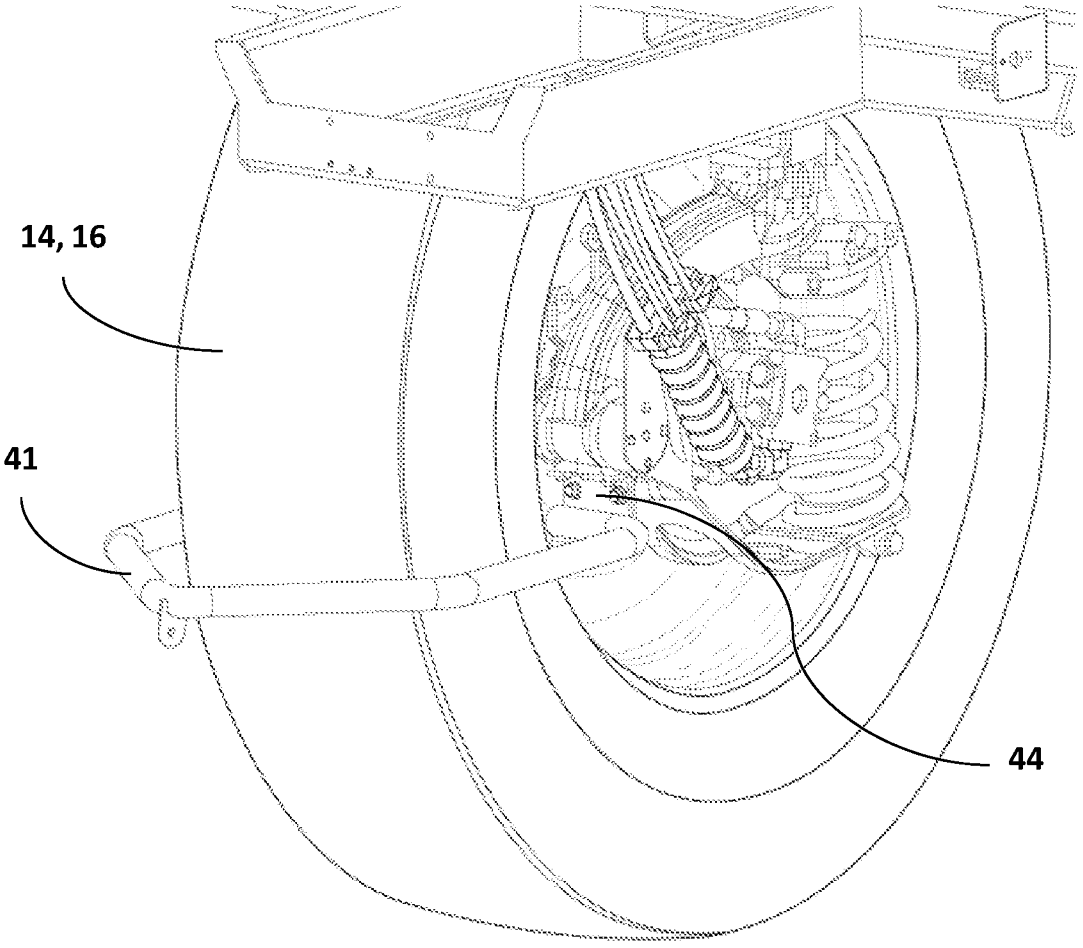
FIGS. 3A, 3B and 3C illustrate perspective views of an open protective frame secured to a suspension frame of an agricultural work vehicle in accordance with the aspects of the present subject matter.
Figure 4A:
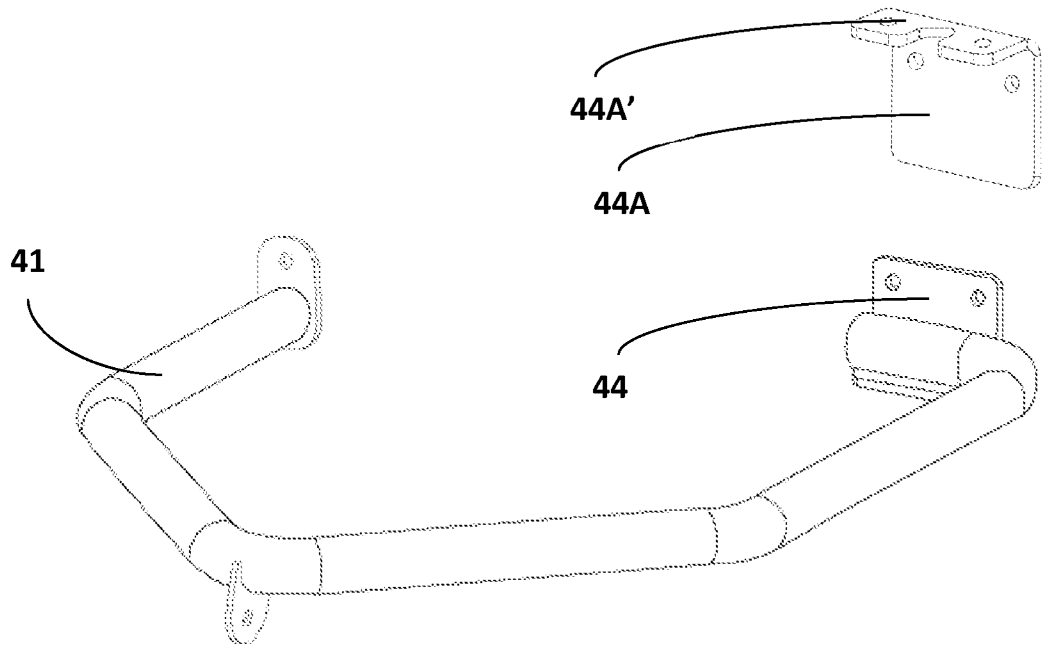
FIGS. 4A and 4B illustrate front perspective views of a protective frame for a wheel of an agricultural work vehicle according to an aspect of the present subject matter in a first possibility of installation.
Figure 4B:
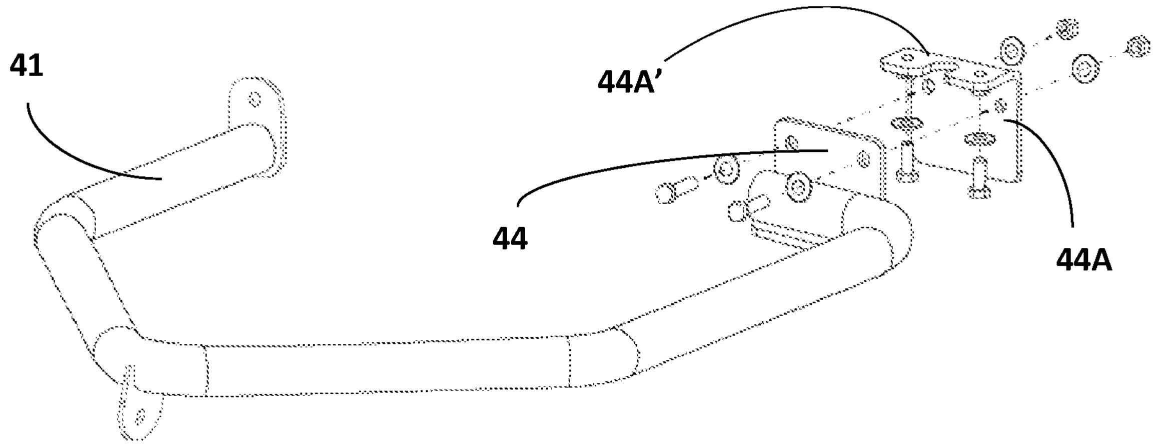

With reference to FIGS. 3A, 4A and 4B, there is illustrated an open protective frame formed by a base segment 41 that at least partially surrounds the front part of a wheel 14, 16 of an agricultural vehicle 10, and a primary fastener element 44 secured to the suspension frame. As shown in FIGS. 4A and 4B, the primary fastener element 44 has an auxiliary fastener plate 44A with a bent end 44A' to allow securing of the fastener element 44 on sloped surfaces. The fastener element 44 can be welded to the base segment 41. In this embodiment, the protective frame is further from the ground, being more suitable for highly uneven and bumpy terrain. This greater distance prevents the frame from hitting the ground. Determining the distance depends on the diameter of the wheel.

Figure 3B:
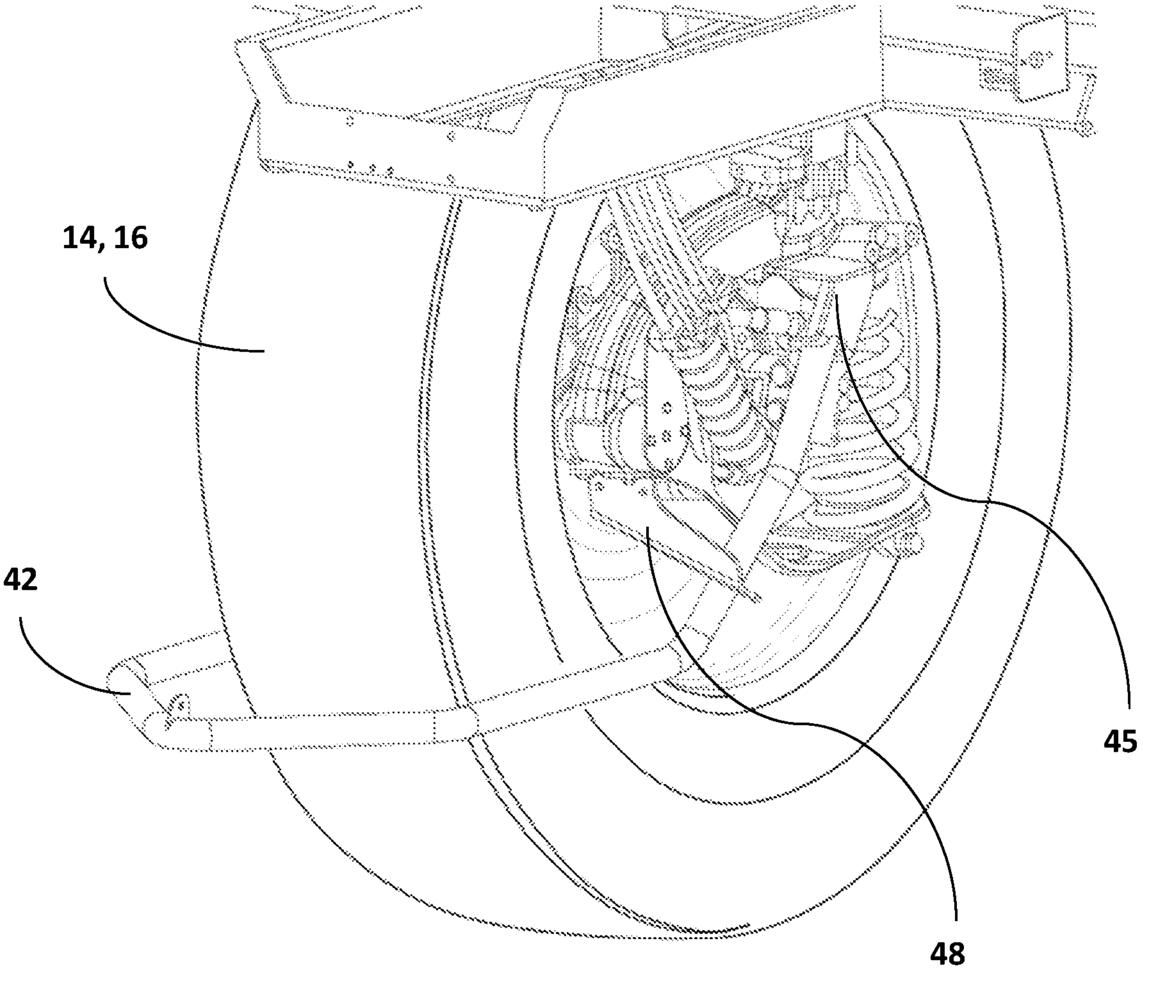
Figure 3C:
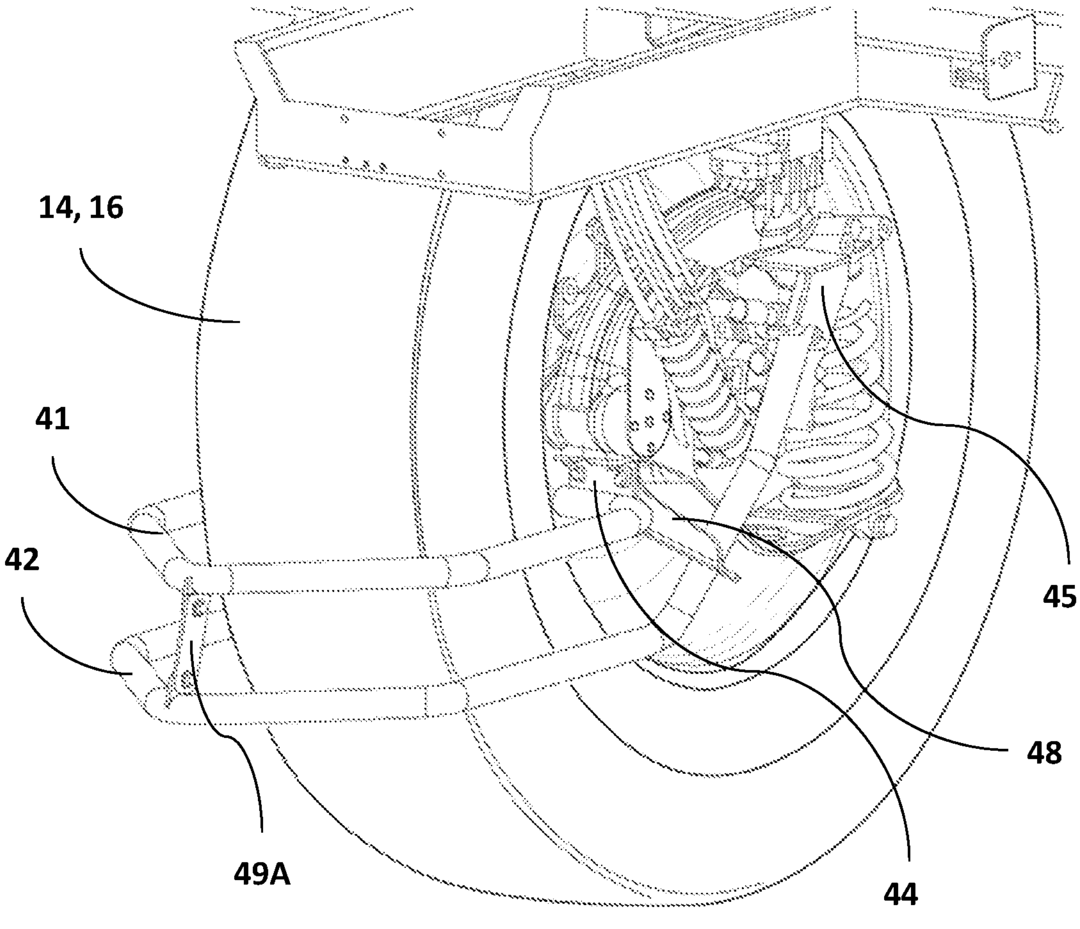
Figure 5A:
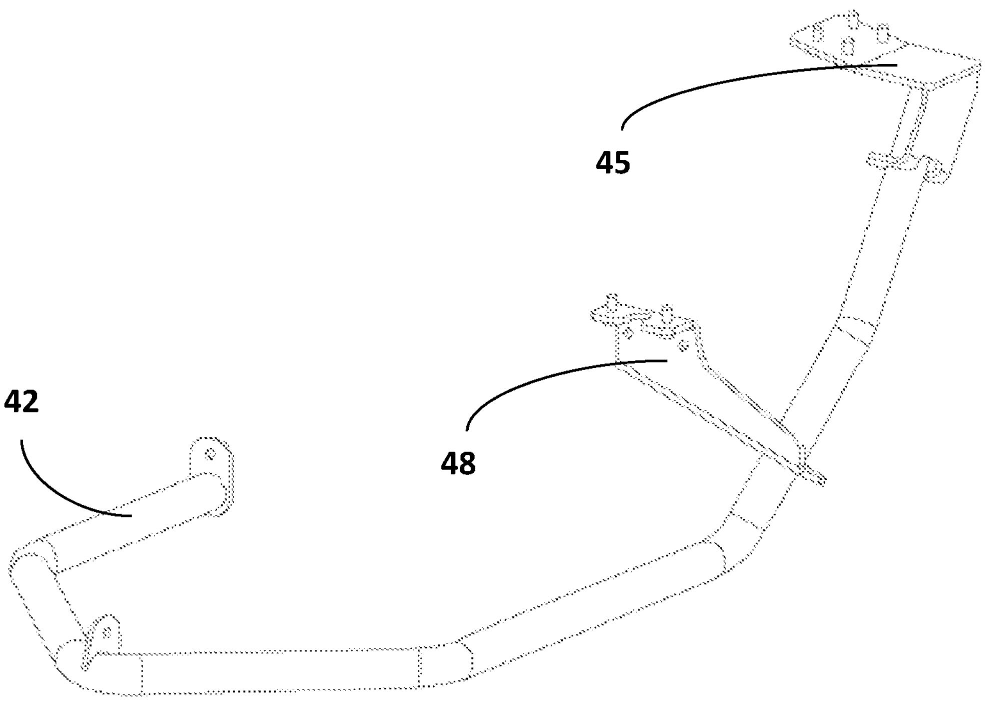
FIGS. 5A and 5B illustrate front perspective views of a protective frame for a wheel of an agricultural work vehicle according to another aspect of the present subject matter in a second possibility of installation.
Figure 5B:
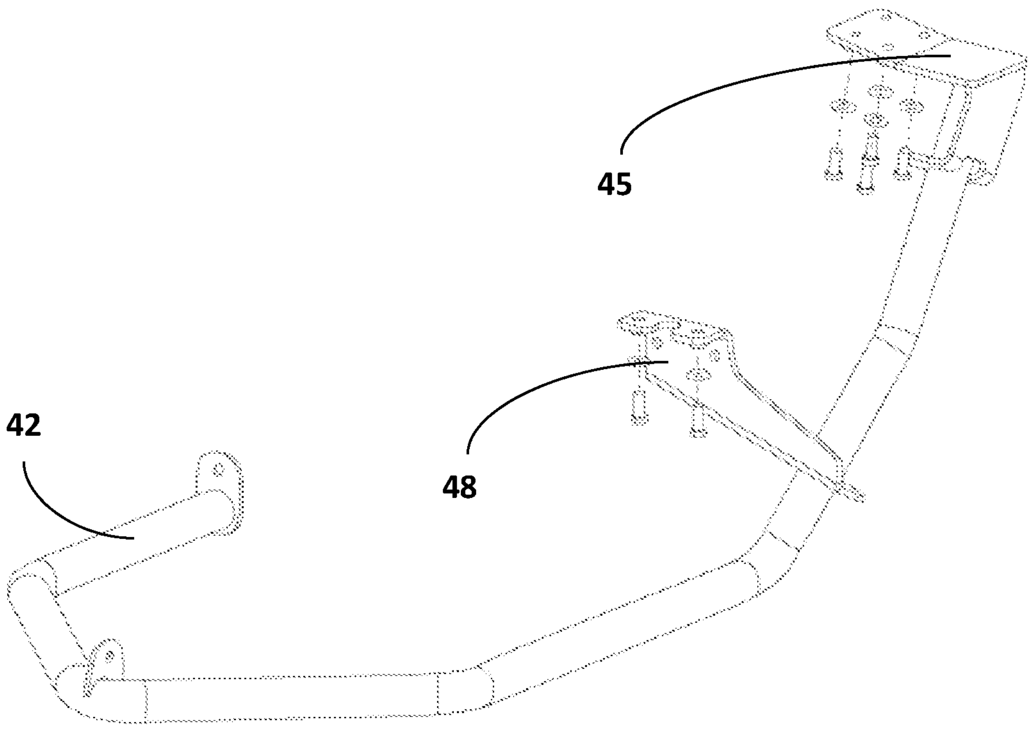
Figure 6A:
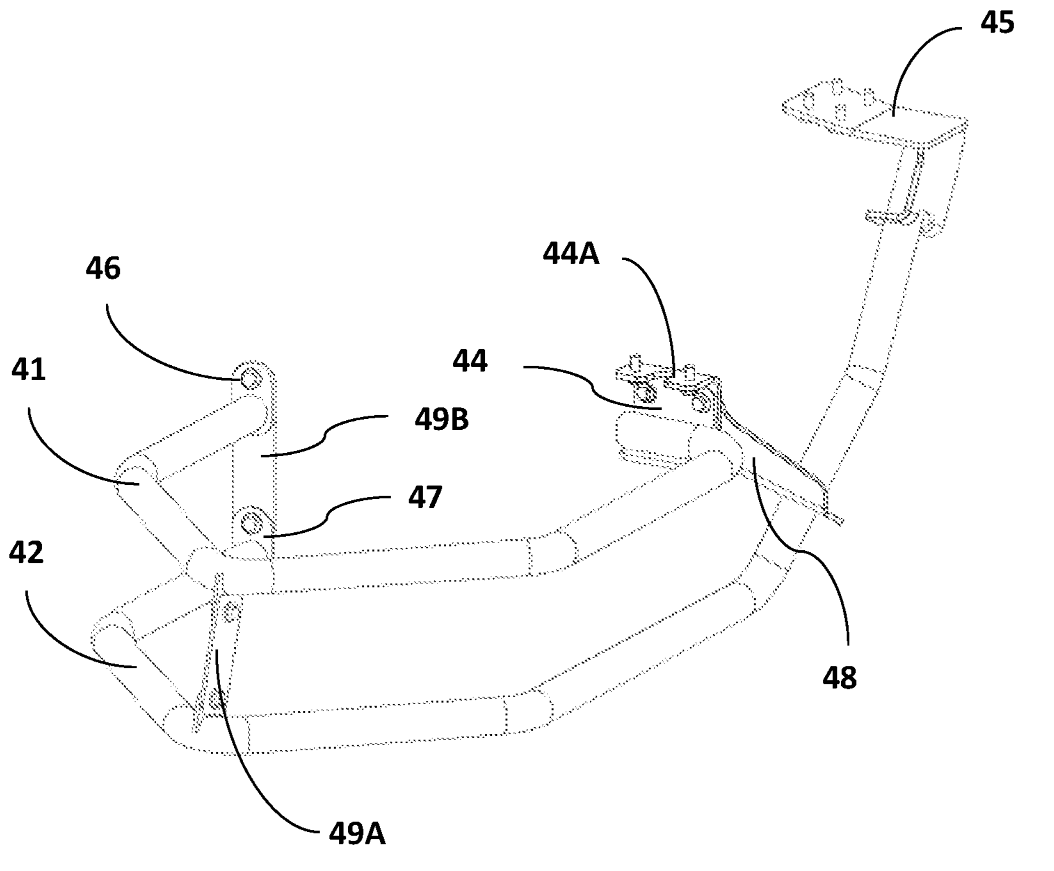
FIGS. 6A, 6B and 6C illustrate views in front, rear and exploded perspective of a protective frame for a wheel of an agricultural work vehicle according to another aspect of the present subject matter in a third possibility of installation.
Figure 6B:
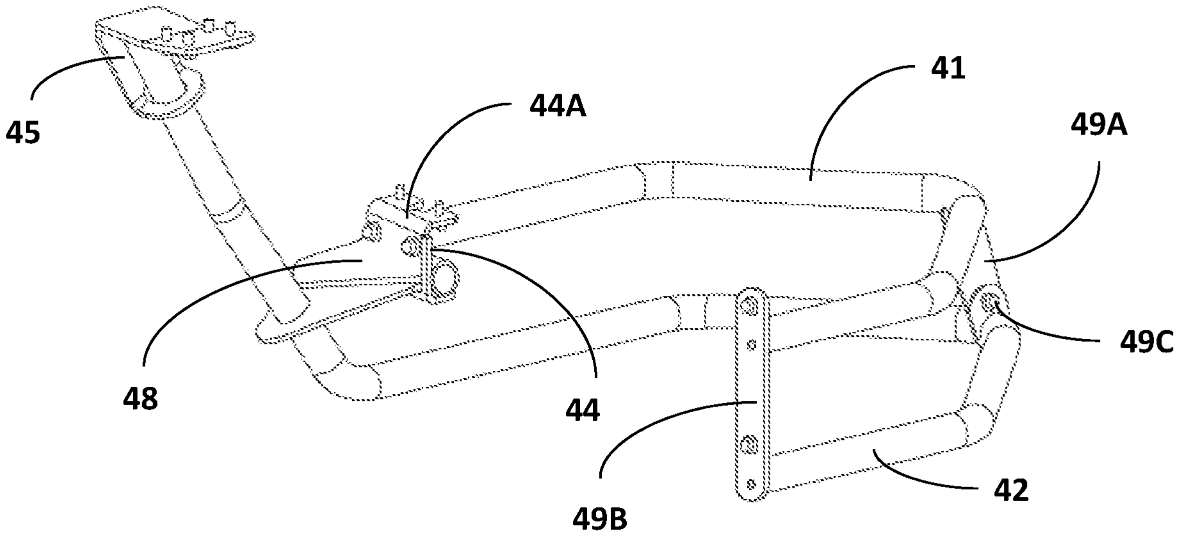
Figure 6C:
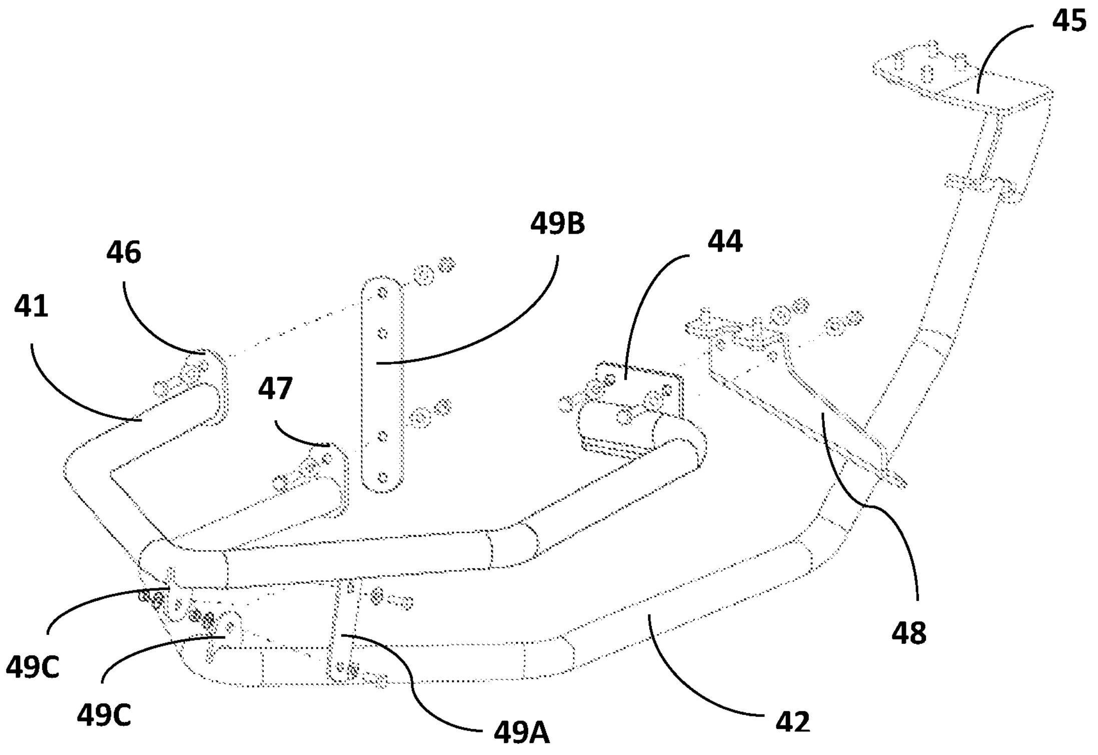
Figure 7:
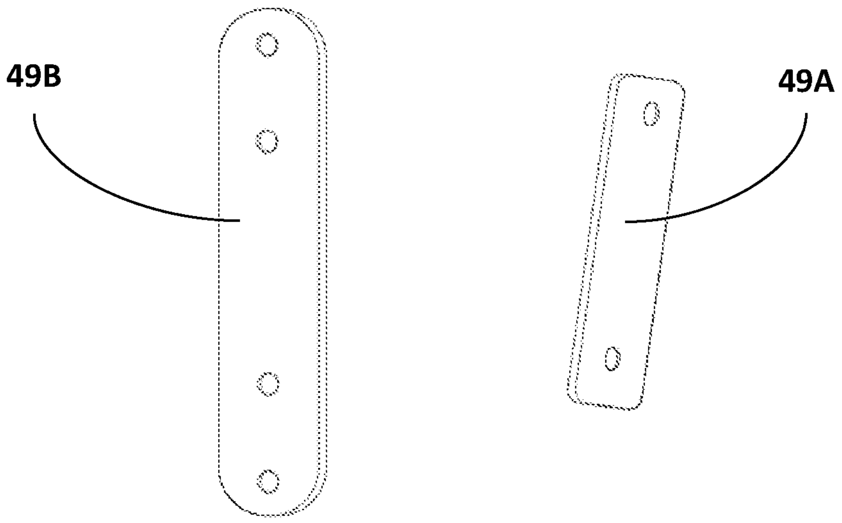
FIG. 7 illustrates stabilization segments of a protective frame for a wheel of an agricultural work vehicle according to another aspect of the present subject matter.

In the embodiment illustrated in FIGS. 3B, 5A and 5B, the open protective frame is formed by a base segment 42 that at least partially surrounds the front part of a wheel 14, 16 of an agricultural vehicle 10, at least one primary fastener element 45 secured to the suspension frame and a secondary fastener element 48, with a hole at one end to be fitted and welded to the base segment, secured to the suspension frame. In this embodiment, the protective frame is closer to the ground and, therefore, improves the efficiency in opening the crop rows, avoiding damage and losses to the crop.

The secondary fastener element 48 secured to the wheel suspension frame 14, 16 provides greater stability to the protective frame, as illustrated in the embodiment shown in FIGS. 3B, 5A and 5B. The secondary fastener element 48 has a hole to be fitted and welded to the base segment.

There is still a third possibility of configuring the open protective frame of the present invention. FIGS. 3C, 6A, 6B and 6C show a more robust embodiment of the frame, an integral protective frame, which maintains proximity to the ground and therefore improves efficiency in opening crop rows, whilst also being more resistant to possible shocks against the ground, combining the advantages of the embodiments illustrated in FIGS. 3A and 3B. This configuration is more suitable for terrains with low to medium irregularities. In this option, the base segments 41 and 42 surround at least partially the front part of a wheel 14, 16 of an agricultural vehicle 10, with the primary fastener element 44 secured to the secondary fastener element 48. The primary fastener element 45 and secondary fastener element 48 are secured to the suspension frame. There is still the presence of two of primary stabilization segment 49A and secondary stabilization segment 49B. Stabilization segments 49A, 49B connect first and second base segments 41, 42 at the front and outside of the wheel, respectively. The connection made by the secondary stabilization segment 49B can be through two auxiliary fastener plates 46 and 47 secured to the external ends of the base segments 41, 42. The plates 46 and 47 can be welded to the external ends of the base segments 41, 42.

In this third possibility of configuration of the open protective frame of the present invention, the primary stabilization segment 49A and secondary stabilization segment 49B are elongated metal plates of variable length. The ends of the primary stabilization segment 49A are drilled and secured via removable fastener devices to auxiliary fastener plates 49C drilled and welded to the base segments. The ends of secondary stabilization segment 49B are drilled and secured through removable fastener devices to the auxiliary fastener plates 46 and 47.

Complementarily, the base segment can be a single piece, metallic and segmented, in which the segments can be delimited by curves (folds) or joined by welds. Removable fastener devices can be of screw, clip or rivet type.

The present invention brings the advantage of the user being able to choose different possible embodiments of the protective frame, providing flexibility for users to work with the protective frame in different mounting configurations, considering the distance between the frame and the ground, the efficiency in opening the culture rows, and the surface condition of the land. The open protective frame now revealed has a simpler configuration, lower cost, in addition to providing the most appropriate use of the protective frame according to the needs of each agricultural crop and the conditions of the cultivated land.

The protective frame components are attachable and lightweight, contributing to a quick, practical and easy-to-execute installation.

This disclosure uses examples to describe the invention, in various embodiments, and also to enable anyone skilled in the art to practice the invention, including making and using any devices or systems and performing any methods embodied therein. The patentable scope of the invention is defined by the claims and may include other examples that occur to those skilled in the art. Such other examples are intended to fall within the scope of the claims if they include structural elements that do not differ from the literal language of the claims, or if they include equivalent structural elements with insubstantial differences from the literal languages of the claims.

The invention claimed is:

1. A protective frame for a wheel of an agricultural work vehicle, comprising:

a first base segment configured to at least partially surround a front part of the wheel of the agricultural work vehicle;

a primary fastener element configured to secure the first base segment to the wheel, wherein the primary fastener element is secured to a wheel suspension frame; and a secondary fastener element secured to the wheel suspension frame, the secondary fastener element has a hole at one end to be fitted and welded to the first base segment.

2. The protective frame according to claim 1, wherein:

the primary fastener element comprises an auxiliary fastener plate, the auxiliary fastener plate has a bent end which enables the primary fastener element to be secured on an inclined surface.

3. The protective frame according to claim 1, comprising:

a second base segment configured to at least partially surround the front part of the wheel of the agricultural work vehicle with a second primary fastener element configured to secure the second base segment on the wheel, wherein the primary fastener element is secured to the secondary fastener element, and the second primary fastener element and the secondary fastener element are secured to the wheel suspension frame;

two auxiliary fastener plates secured to external ends of the first and second base segments, respectively; and a primary stabilization segment and a secondary stabilization segment;

wherein the primary stabilization segment connects the first and second base segments at the front part of the wheel; and wherein the secondary stabilization segment connects the first and second base segments via the two auxiliary fastener plates on an outside of the wheel.

4. The protective frame according to claim 3, wherein:

the primary fastener element and one of the two auxiliary fastener plates are welded to the first base segment, and the second primary fastener element and one of the two auxiliary fastener plates are welded to the second base segment.

5. The protective frame according to claim 3, wherein:

the primary stabilization segment and the secondary stabilization segment are elongated metal plates of variable lengths.

6. The protective frame according to claim 3, wherein:

ends of the primary stabilization segment are drilled and secured through removable fasteners to two additional auxiliary fastener plates that are drilled and welded to the first and second base segments, respectively.

7. The protective frame according to claim 3, wherein:

ends of the secondary stabilization segment are drilled and secured through removable fasteners to the two auxiliary fastener plates.

8. The protective frame according to claim 1, wherein:

the first base segment is a single piece, metallic, and segmented, in which segments of the first base segment are delimited by curves or joined by welds.

9. The protective frame according to claim 1, wherein:

removable fasteners are screws, staples, or rivets.

10. A protective frame for a wheel of an agricultural work vehicle, comprising:

a first base segment configured to at least partially surround a front part of the wheel of the agricultural work vehicle;

a primary fastener element configured to secure the first base segment to the wheel, wherein the primary fastener element is secured to a wheel suspension frame;

a secondary fastener element secured to the wheel suspension frame;

a second base segment configured to at least partially surround the front part of the wheel of the agricultural work vehicle with a second primary fastener element configured to secure the second base segment on the wheel, wherein the primary fastener element is secured to the secondary fastener element, and the second primary fastener element and the secondary fastener element are secured to the wheel suspension frame;

two auxiliary fastener plates secured to external ends of the first and second base segments, respectively; and a primary stabilization segment and a secondary stabilization segment, wherein the primary stabilization segment connects the first and second base segments at the front part of the wheel, and the secondary stabilization segment connects the first and second base segments via the two auxiliary fastener plates on an outside of the wheel.

11. The protective frame according to claim 10, wherein:

the primary fastener element and one of the two auxiliary fastener plates are welded to the first base segment, and the second primary fastener element and one of the two auxiliary fastener plates are welded to the second base segment.

12. The protective frame according to claim 10, wherein:

the primary stabilization segment and the secondary stabilization segment are elongated metal plates of variable lengths.

13. The protective frame according to claim 10, wherein:

ends of the primary stabilization segment are drilled and secured through removable fasteners to two additional auxiliary fastener plates that are drilled and welded to the first and second base segments, respectively.

14. The protective frame according to claim 10, wherein:

ends of the secondary stabilization segment are drilled and secured through removable fasteners to the two auxiliary fastener plates.

15. The protective frame according to claim 10, wherein:

the first base segment is a single piece, metallic, and segmented, in which segments of the first base segment are delimited by curves or joined by welds.

16. The protective frame according to claim 10, wherein:

removable fasteners are screws, staples, or rivets.

* * * * *